March 19, 1968

G. R. ANDERSON 3,373,785

FRUIT PROCESSING BATTERY

Filed June 6, 1966

INVENTOR
GERALD R. ANDERSON

BY Francis W. Anderson
ATTORNEY

March 19, 1968 G. R. ANDERSON 3,373,785
FRUIT PROCESSING BATTERY
Filed June 6, 1966

FIG_11

FIG_12

INVENTOR
GERALD R. ANDERSON
BY Francis W. Anderson ATTORNEY

United States Patent Office 3,373,785
Patented Mar. 19, 1968

3,373,785
FRUIT PROCESSING BATTERY
Gerald R. Anderson, Campbell, Calif., assignor to
FMC Corporation, San Jose, Calif., a corporation
of Delaware
Filed June 6, 1966, Ser. No. 555,400
15 Claims. (Cl. 146—43)

The present invention pertains to a pear processing battery arranged to orient pears into multiple processing lanes and automatically feed the pears from each lane into an associated pear processing machine which peels, halves, cores and trims the pears for subsequent canning.

Most previous attemps at mechanically orienting and feeding pears into automatic processing machines have combined the orienting and feeding steps, and have not been particularly successful insofar as high production speeds and accuracy are concerned. Also, a usually complex reject mechanism is required to remove any pears which are improperly oriented or fed.

In general terms, the present invention provides a pear processing battery wherein the orienting and feeding steps are separate, and wherein a visual inspection station is provided intermediate the orienting and feeding stations so that the orientation of the pears can be checked and corrected, if necessary. This eliminates the previously required reject mechanism, and enables only two attendants to inspect and correct the pears for as many as ten processing machines, for a total output of peeled, cored and halved pears as high as about 500 whole pears per minute.

A highly efficient manually fed pear processing machine is disclosed in Patent No. 3,111,972 to Anderson et al. The present invention includes a plurality of such machines, each having a novel transfer arm arranged to transfer oriented whole pears from a multiple lane conveyor into the machine for processing. The construction of the transfer arms, and the cooperative arrangement of the machine components makes possible a compact, automatic pear processing battery achieving a high output with a minimum of attendants.

An object of the present invention is to provide an improved fruit processing battery.

Another object of the invention is to provide fruit transfer means arranged to grip whole fruit from a moving conveyor and feed the fruit into a fruit processing machine beside the conveyor.

Another object is to provide fruit transfer means according to the preceding object wherein the conveyor has multiple fruit supply lanes and the transfer stroke is such that the machine can be supplied from any one of several predetermined lanes according to the interspacing of the processing machine and the conveyor.

Another object is to provide a battery of fruit processing machines arranged in a row at each side of a central fruit conveyor having multiple conveying lanes, and wherein each machine is fed from an individual one of said conveying lanes.

Other objects and advantages will become apparent from the following description and accompanying drawings, wherein.

Briefly, the fruit processing battery B (FIG. 1) includes several cooperatively integrated machines which are the subject of copending patent applications, or issued patents, that are assigned to the same assignee as the assignee of the present invention. These previously disclosed machines include a bulk feeder 13, a shuffle feeder 14, a pear orienting mechanism 16, and a plurality of the previously mentioned Anderson et al. pear processing machines 18. The bulk feeder 13 and the shuffle feeder 14 are disclosed in my pending patent application Ser. No. 473,785, now Patent No. 3,319,639. The pear orienting mechanism 16 is disclosed in my Patent No. 3,236,357. Each of the above identified disclosures is incorporated by reference into the present disclosure.

The fruit processing battery B may optionally include the bulk feeder 13, which in the present instance is arranged to receive a bulk supply of randomly oriented, unpeeled pears, and to transfer the pears into eight longitudinal feed lanes or rows of the shuffle feeder mechanism 14. In lieu of the bulk feeder 13, the pears can be manually fed into the shuffle feeder 14 from any conveniently located supply conveyor. It is also possible to manually feed the pears directly into the pear orienting mechanism 16, or directly onto the supply conveyor 20, but the overall processing speed will decrease and the processing cost will increase. From the shuffle feeder 14, the pears in each of the eight rows are discharged into a corresponding lane of the pear orienting mechanism 16, for ultimate delivery into one of eight of the pear processing machines 18.

Figure 1:
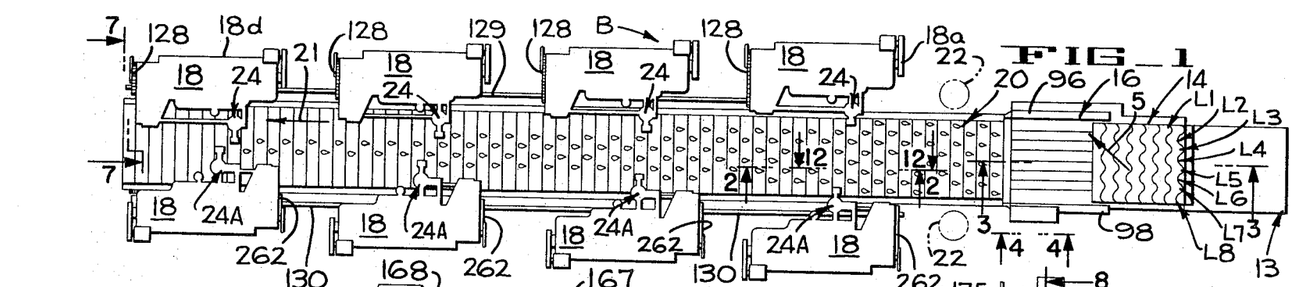
FIGURE 1 is a plan of the fruit processing battery of the present invention.

The pear processing machines 18 are located four at each side of a continuously driven supply conveyor 20. A common power train is provided for the entire processing battery B except the bulk feeder 13, so that the shuffle feeder 14, the orienting mechanism 16, the processing machines 18 and the supply conveyor 20 are continuously driven in timed relation. The pears in each longitudinal lane of the supply conveyor 20 are fed thereto butt-end first adjacent and between two operator's stations 22, at which stations the operators manually reposition the occasionally misoriented pears, and perform attendant functions such as the removal of pears which may not meet the desired quality standards. While only two operators tend the eight pear processing machines 18, the output of the processing battery B is approximately 400 peeled, cored, trimmed and halved whole pears per minute due to the efficient, cooperative interaction of the individual components of the fruit processing battery.

Figure 2:
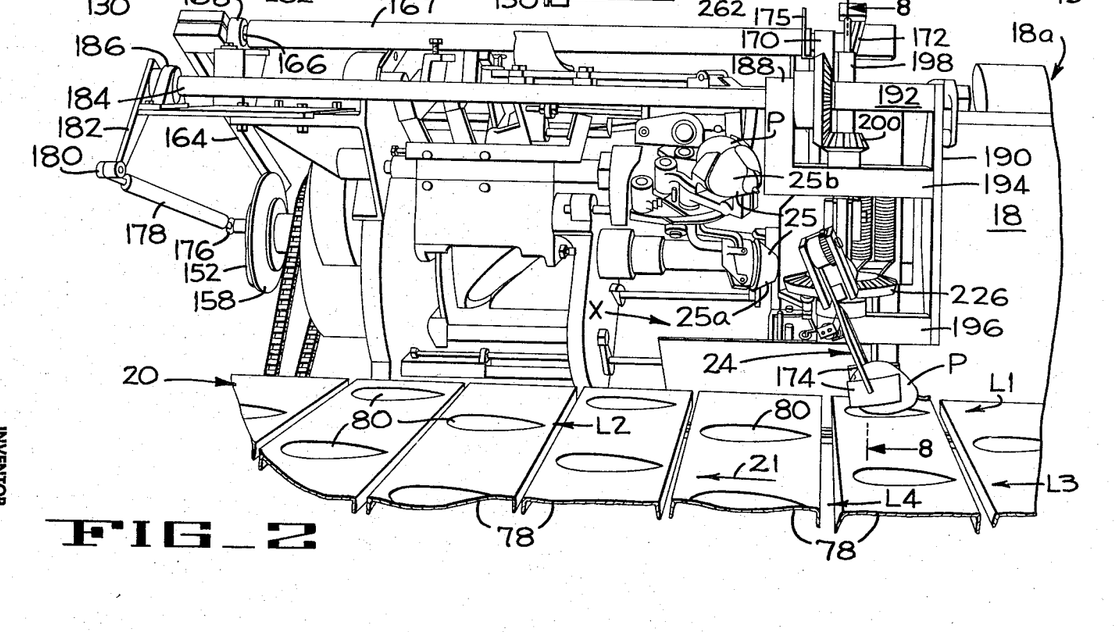
FIGURE 2 is a fragmentary perspective of part of the apparatus shown in FIGURE 1, and is taken substantially from the position indicated by the arrows 2—2 on FIGURE 1.

With continued general reference to the overall processing battery B (FIGS. 1 and 2) a transfer arm assembly 24 is driven in timed relation with each of the pear processing machines 18 and operates to grip successive pears P from one lane of the moving supply conveyor 20, and to transfer each pear downstream and place it stem end down into a feed cup assembly 25 at a feeding station X. The lowermost feed cup assembly at 25a in FIGURE 2 is moving toward its feeding position to receive the illustrated pear P being gripped by the transfer arm assembly 24, and the conveyor 20 is moving in the direction of the arrow 21. The feed cup at 25b has previously received the pear which preceded the pear moving toward its feeding position.

The pear processing machines 18 at one side of the supply conveyor 20 are merely reversed end to end from the machines at the other side of the supply conveyor. However, the four transfer arm assemblies 24 at the right side looking downstream of the supply conveyor 20 operate in a reverse direction relative to the processing machine 18 which they feed, as compared to the other transfer arm assemblies relative to their processing machines, because each group of transfer arms has the same transfer motion, i.e., a pear is gripped upstream from its designated pear processing machine and is transferred in a downstream direction into one of the feed cup assemblies 25.

The ensuing description is directed primarily to the first pear processing machine 18 at 18a (FIG. 1) of the fruit processing battery B. One more point of importance to be noted before the more comprehensive description which follows, is that all transfer arm assemblies 24 have the same length of transfer motion and are so related to their respective processing machines 18 that the machines, if so positioned, can be fed from any of the four adjacent supply lanes of the supply conveyor 20. Thus, the two farthest upstream processing machines 18 are spaced from the supply conveyor 20 so as to be fed with pears from the outermost lanes L1 and L8, and the succeeding pairs of processing machines are fed from the next inward pairs of lanes L2, L7 and L3, L6 and L4, L5 of the supply conveyor 20.

As previously mentioned, the bulk feeder 13 (FIG. 3) can be optionally used to automatically feed whole unpeeled pears into the shuffle feeder 14, or the bulk feeder can be eliminated and the shuffle feeder can be manually or otherwise fed. If the bulk feeder 13 is employed, the pears float in a liquid W, such as fresh water, into a flume discharge neck 30. The liquid is circulated in the direction of the arrow 31 downward through a vertically reciprocable grating 32 which is formed of laterally spaced rods that can support the smallest pears to be handled. The liquid flows into a conduit 33 for recirculation to the flume discharge neck 30. The grating 32 has arcuate side walls 34, only one of which is shown, that carry the grating from its lowermost position illustrated, to an upper position in which the grating is coplanar with an inlet chute 36 of the shuffle feeder 14. Reciprocating movement of the grating 32 is effected by a variable speed motor 38 having a crank arm 40. The crank arm is pivoted at 41 to a link 42, the other end of the link being pivoted at 44 to one of two triangular frameworks 46 that are each connected at their upper portions to the arcuate walls 34. The lower forward portions of the frameworks 46 are mounted on a rockshaft 48 that is rotatably mounted in a floor-supported frame 49 common to the shuffle feeder 14 and the orienting mechanism 16.

The rods forming the grating 32 have arcuate depending leg portions 50 which act as a gate for the pears when the grating is in its uppermost position. Thus, when the grating is raised, the pears overlying the grating are transferred onto the shuffle feeder inlet chute 36, and the liquid circulating downward into the conduit 33 maintains the next group of pears against the legs 50 for subsequent movement onto the grating. In the present instance, the shuffle feeder 14 (FIG. 3) is designed to advance eight single file lanes of pears toward the pear orienting mechanism 16, step by step upward over a plurality of fixed flights 52 by a plurality of movable flights or pushers 54. As will be presently described, the pears in the even numbered lanes L2, L4, L6 and L8 are discharged at one time, and the pears in the odd numbered lanes L1, L3, L5 and L7 are discharged at a different time.

The pushers 54 and flights 52 are in the form of elongate, scalloped slats which, as illustrated in FIGURE 1 and in the previously identified patent application, define concave pear-receiving pockets in each of the eight conveying lanes. The pushers 54 are secured to upwardly projecting fingers 56 of a slide frame 58. A link 60 is connected to the slide frame 58 and to an arm 62 which is reciprocated by a powered rockshaft 64. Power for the rockshaft derives from an idler shaft 66 of the supply conveyor 20, and is transmitted to an arm 68 on the rockshaft 64 by a rod 70 having an eccentric drive connection, not shown, to the idler shaft 66. The rod 70 is thus oscillated endwise so that the pushers 54 and the slide frame 58 move up and down; the pears are thereby advanced over the discharge end of the shuffle feeder 14.

Figures 3, 4:
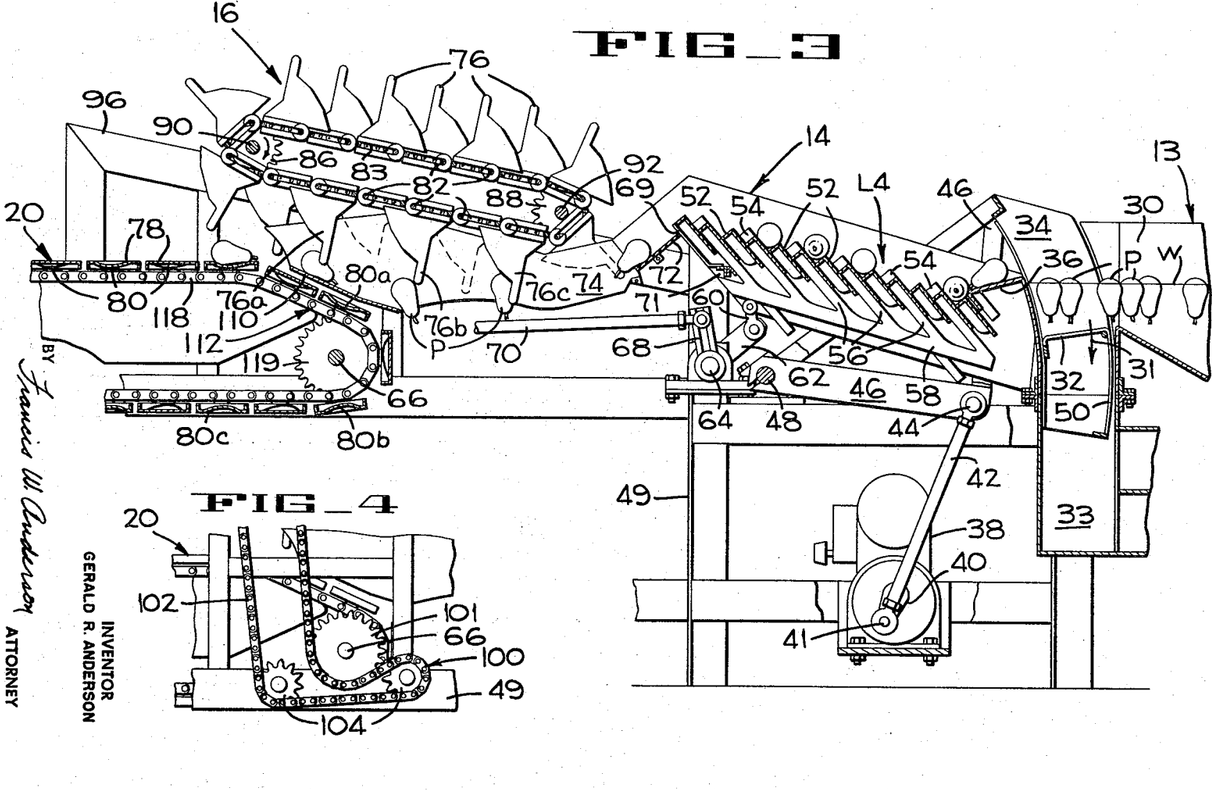
FIGURE 3 is a vertical section taken along lines 3—3 on FIGURE 1.
FIGURE 4 is a fragmentary elevation taken in the direction of the arrows 4—4 on FIGURE 1.

The lanes L2, L4, L6 and L8 (FIG. 1) each have a gate 69 (FIG. 3). The gates 69 are mounted upon a common bar 71, that is secured to the downstream finger 56 of the slide frame 58, and control their associated lanes to hold back the pears which would otherwise be discharged when the pears in the lanes L1, L3, L5 and L7 are discharged. Thus, when the slide frame rises to its uppermost position from the position shown, the gates 69 rise and block exit of the pears in the even numbered lanes while the pears in the odd numbered lanes are discharged, following which the slide frame is lowered to its illustrated position and the temporarily arrested pears in lanes L2, L4, L6 and L8 are discharged.

At the discharge end of the shuffle feeder 14, the pears in each lane slide one by one down an inclined wall 72 (FIG. 3) and enter an associated lane of the pear orienting mechanism 16. Each of the latter lanes includes a generally U-shaped trough 74 (FIG. 5) and a superposed array of pusher elements 76, the lower flight of which operates to propel the pears through the trough 74, during which the pears become oriented butt-end first and spaced apart in the direction of conveying movement.

The two groups of pusher elements 76 of the odd and even numbered lanes are respectively aligned transversely of the supply conveyor 20 due to the fact that the shuffle feeder 14 feeds the two groups of pears in staggered relation. The pusher elements 76 (FIG. 3) travel slower than the supply conveyor 20. To accommodate this speed differential, the supply conveyor 20 is provided with lateral conveying flights 78 having fruit receiving pockets 80 arranged so that each lane only contains pockets in every other flight. Thus, the lower flight pusher elements 76 (FIG. 3) of the orienting mechanism 16 at 76a, 76b and 76c, will respectively feed oriented pears into the fruit pockets 80a, 80b and 80c.

Each pusher 76 (FIGS. 3 and 5) is mounted on two of a plurality of transverse rods 82 that extend between two endless chains 83, only one of which is shown, that are each trained around a drive sprocket 86 and an idler sprocket 88. A driveshaft 90 and an idler shaft 92 for the sprockets 86 and 88 are each rotatable in bearings 94 (only one being shown) that are mounted atop inclined upper frame members 96 and 98 (FIG. 1). The driveshaft 90 is driven in clockwise direction, as viewed in FIGURE 3, by a chain and sprocket drive train 100 (FIG. 4).

The power for the drive shaft 90 initiates from the supply conveyor idler shaft 66. A sprocket 101 (FIG. 4) on the outer end of the shaft 66 drives an endless chain 102 which is trained around idler sprockets 104, and around a superposed driven sprocket, not shown, on the driveshaft 90 (FIG. 3) of the orienting mechanism 16.

Figures 5, 6:
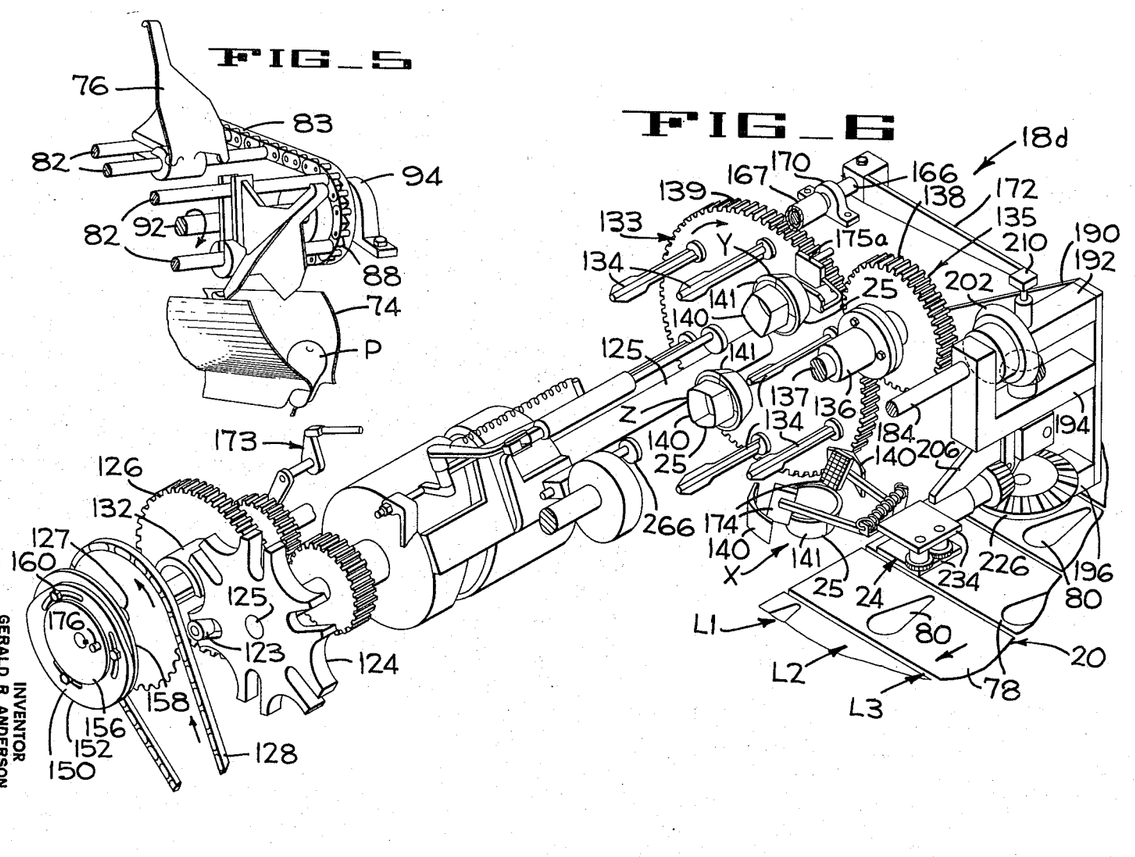
FIGURE 5 is a fragmentary perspective of the area indicated by the arrow 5 on FIGURE 1.
FIGURE 6 is a schematic fragmentary perspective illustrating some of the major parts typical of the apparatus shown in FIGURE 2.

Returning now to the operation of the set of pusher elements 76 and the trough 74 shown in FIGURES 3 and 5, the major length of the trough 74 is of generally V-shaped open bottom cross-section so that the butt end of a pear is initially supported by the trough and hangs stem end down. Each pusher element 76 is also V-shape in elevation so as to substantially fill the inlet end of the trough 74 as it enters the lower portion of its conveying path rearwardly of a pear P previously fed from the shuffle feeder mechanism 14. Near its discharge end, the trough 74 is of substantially U-shape with a closed bottom including a lower wall 110 (FIG. 3). The wall 110 inclines upward in parallel, superposed relation to an inclined portion 112 of the supply conveyor 20, at the upper end portion of which the leading pear in the trough is transferred butt-end first into one of the pockets 80 of the supply conveyor 20.

The supply conveyor flights 78 (FIGS. 2 and 3) are formed of metal which is stamped to provide the concave pockets or depressions 80 that generally conform to the shape of a pear. The end portions of each flight 78 (FIGS. 7 and 11) are secured by a bracket 116 to an endless chain 118. The chains 118 are trained around spaced idler sprockets 119 (only one being shown in FIG. 3) on the idler shaft 66, and around drive sprockets 120 (FIG. 11) on a driveshaft 122.

The basic operating components typical of all of the pear processing machines 18 are shown in FIGURE 6, as well as the components typical of the transfer arm assemblies 24 which are associated with the processing machines at the right side of the supply conveyor 20, i.e., the machines which are fed from lanes L1-L4. A Geneva gear 124 is keyed on a turret driveshaft 125. The Geneva gear is actuated by a drive roller 123 carried by a driver gear 126. The drive roller 123 operates in radial slots of the Geneva gear. The gear 126 is keyed to a shaft 127 that is continuously rotated by a chain and sprocket drive train 128 from a jackshaft 129 (FIG. 1) which extends along the right side of the conveyor 20 and is later mentioned in connection with the drive train shown in FIGURE 11. A similar drive shaft 130 extends along the left side of the conveyor 20. A locking ring 132 mounted on the driver gear serves to lock the Geneva gear between its intermittent movements. In operation, the shaft 127 is continuously rotated, and the Geneva gear 124 and the turret shaft 125 are intermittently indexed in 60 degree increments of rotation.

Mounted on the other end portion of the turret drive shaft 125 is a stemming tube turret 133 carrying six equally spaced stemming tubes 134. Pears are ultimately impaled on the stemming tubes, stem end first, and are conveyed in a clockwise direction through the various processing stations where they are trimmed, peeled, cored, halved and discharged from the far side of the machine. Mechanism for feeding the pears into the machine includes a cup turret 135 which has a hollow elongate sleeve 136 disposed upon a stationary shaft 137, driven by a gear 138 that is meshed with a driven gear 139 of the stemming tube turret 133. The sleeve 136 has attachment flanges, not shown, which carry three of the feed cup assemblies 25 that are disposed equi-distantly around the sleeve 136.

Each feed cup assembly 25 (FIG. 6) comprises movable pairs of jaws 140 and 141 which respectively correspond to the butt ends and the stem ends of the pears. The jaws of each pair are spring-urged together, and the jaws 140 cooperatively provide a centering chamber which, at a feed station X, is upright to receive a pear stem-end down. The jaws 140 at this time have been mechanically opened to admit the pear. The jaws 140 are then released whereby they center the butt end of the pear.

The transfer arm assembly 24 removes successive pears from the corresponding lane of the supply conveyor 20 and places them into the feed cup assemblies 25 as they successively become positioned at the feed station X. It should be noted that the apparatus shown in FIGURE 6 illustrates the pear processing machine at 18d (FIG. 1) which is fed from the conveyor lane L4, but that the construction of its next described transfer arm assembly is typical of all of the pear processing machines at the right side of the conveyor 20.

The drive train for each transfer arm assembly 24 (FIGS. 2, 6 and 7) includes the shaft 127 for the drive gear 126 of the Geneva gear 124. Near the outer end portion of the shaft 127 is a cam plate 150 having a camming edge 152 and an enlarged central aperture 154 which circumscribes a hub 156. Hub 156 is keyed to the shaft 127, and is secured to a disc 158, to which the cam plate is adjustably secured by bolts 160. The cam plate 150 is engaged with a cam follower roller 162 that rides on the camming edge 152 and is carried by a lever 164. The lever 164 is clamped onto the downstream end portion of an actuating shaft 166 which, as shown in FIGURE 2, extends the length of the processing machine 18 through a hollow-shaft 167 and is rotatably mounted in bearings 168 and 170 that are fixed atop support brackets secured to the housing of the machine. The upstream end portion of the actuating shaft 166 carries a pear gripper actuating lever 172 that is arranged to open and close a pair of pear grippers 174 of the transfer arm assembly 24.

The hollow shaft 167 (FIG. 2) replaces a similar shaft shown in the aforementioned Anderson el al. patent, and is oscillated by linkage indicated at 173 (FIG. 6) to actuate a bobbing knife 175 (FIG. 7) which trims the stem end of a pear after its stem end is seated against a centering gauge 175a.

The hub 156 (FIGS. 6 and 7) has an eccentric drive connection at 176 to a shaft 178 (not shown in FIGURE 6), the latter shaft being pivotally connected at 180 to a lever 182 that is clamped to an actuating shaft 184. Shaft 184, as shown in FIGURE 2, extends the length of the machine, and is rotatably mounted in a fixed support bearing 186 and in an upright bar 188 of the transfer arm assembly 24. The shaft 184 transmits power to the transfer arm assembly to cause the pear grippers 174 to move between a pear pickup position adjacent one of the moving pockets 80 of the supply conveyor 20, to a pear discharge position in which the pear thus removed from the supply conveyor 20 lies stem-end down and overlies the cup assembly 25 at the feed station X of the pear processing machine 18.

Figure 8:
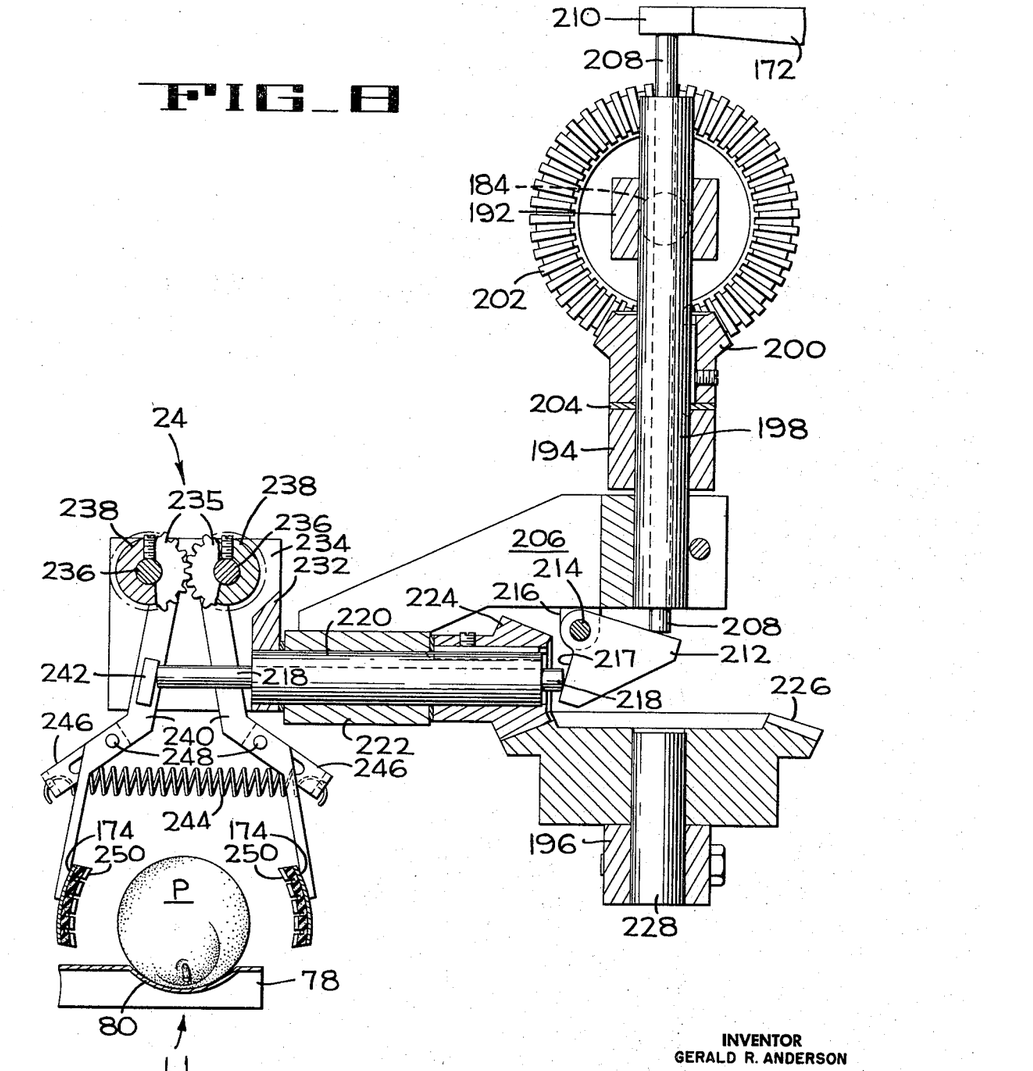
FIGURE 8 is a fragmentary vertical section taken substantially along the plane indicated by the arrows 8—8 on FIGURE 2.

Each transfer arm assembly 24 is mounted upon a fixed plate 190 which projects from the housing of the processing machine and has welded thereto three vertically spaced horizontal bars 192, 194 and 196. The bars 192 and 194 (FIGS. 2 and 8) are provided with apertures which rotatably mount a vertical, tubular shaft 198 to which is keyed a pinion gear 200. The pinion gear 200 is intermittently oscillated by a gear 202, which is mounted upon the actuating shaft 184, and is supported by a thrust washer 204 which rests atop the bar 194. Beneath the bar 194, a bracket 206 is clamped to the tubular shaft 198, said bracket carrying the gear grippers 174, and associated mechanism presently described, back and forth in a horizontal plane.

Disposed slidably within the tubular shaft 198 is a push rod 208, the upper end of which underlies a block 210 on the free end of the pear gripper actuating lever 172. A first face of a relay block 212 abuts the lower end of the push rod 208 and is pivoted upon a pivot pin 214 that is mounted in two depending ears 216 of the bracket 206. Another face 217 of the relay block, normal to the first face, abuts a horizontally disposed push rod 218 which is slidably mounted in a tubular shaft 220. By means of the described construction, downward motion of the push rod 208 pivots the relay block 212 and produces outward movement of the push rod 218 to open the pear grippers 174 in a manner presently described.

The tubular shaft 220 is rotatably mounted in a cylindrical sleeve 222 that is secured to the bracket 206. A pinion gear 224 is keyed to the inwardly projecting end portion of the shaft 220, and is meshed with a non-rotatable bevel gear 226 that is fixed to a vertical shaft 228, the shaft being clamped in the bar 196 in a preselected rotative position. Thus, as the bracket 206 is swung around the vertical axis of the shaft 198 when the gear 202 is oscillated, the horizontal shaft 220 is rotated, due to rotation of the pinion gear 224 as a consequence of its meshed relation with the fixed bevel gear 226. As diagrammatically indicated in FIGURES 9 and 10, this causes a compound motion of the pear grippers 174 as they move along a path 230 between the pear pickup position shown in FIGURE 9, to the pear release position shown in FIGURE 10, whereby the pear is raised from a horizontal position on the supply conveyor 20, to an upright position centered over the cup jaws 141.

Returning now to FIGURES 6 and 8, the outer end portion of the horizontal tubular shaft 220 is secured to a vertical bar 232 which is secured at each end to a plate 234, the two plates straddling a pair of intermeshed gears 235, and rotatably mounting the respective gear mounting shafts 236. The hub portion 238 of each gear carries an elongate gripper arm 240, the outermost one of which has an abutment block 242 that is engaged with the outer end of the push rod 218, whereby outward movement of the push rod simultaneously opens or separates the gripper arms. A tension spring 244 urges the gripper arms together, and is hooked to individual adjustable slotted mounting plates 246 that are secured by bolts 248 to the arms. Each arm 240 at its lower end portion carries the pear grippers 174, which grippers are each provided with a resilient fruit gripping pad 250. Both the grippers and pads are curved end to end, and side to side, so as to conform generally to the shape of the butt ends of the pears.

Figure 12:
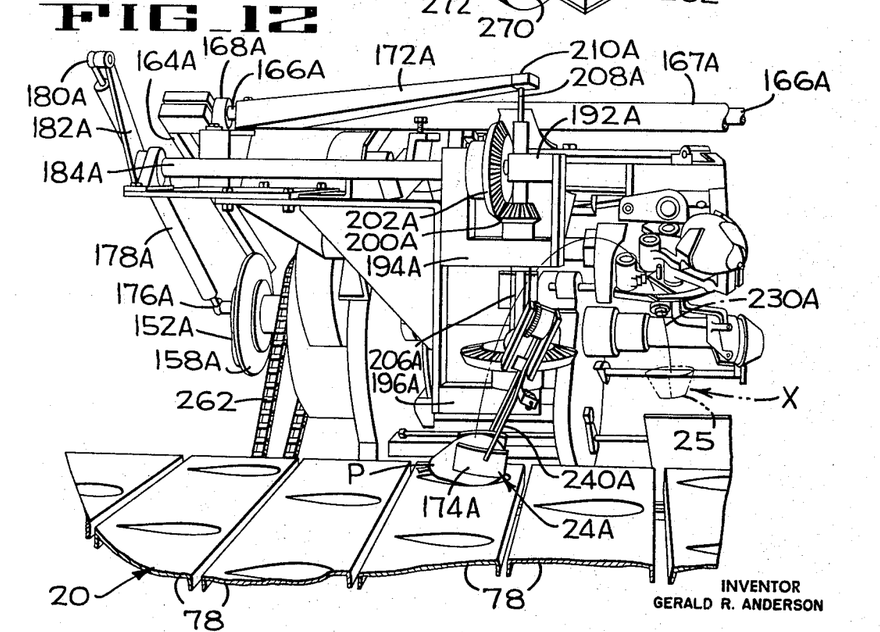
FIGURE 12 is a fragmentary perspective, similar to FIGURE 2, but illustrating the apparatus at the other side of the fruit processing battery, and is taken substantially from the position indicated by arrows 12—12 on FIGURE 1.

The transfer arm assembly 24A shown in FIGURE 12 is typical for the pear processing machines at the left side of the supply conveyor 20, FIGURE 1. These machines have their chain and sprocket drive connections 262 to the jackshaft 130 at their upstream ends. Their respective transfer arm assemblies 24A thus move in a different direction, relative to their processing machines, than the assemblies 24 and processing machines previously described, because the fruit transfer motion in all cases is from a pear gripping position upstream of the feed cups.

The drive trains 128 and 262 each include a clutch, not shown, whereby the individual processing machines 18 can be uncoupled from the jackshafts 129 and 130 for maintenance or repair of any of the pear processing machines.

Most of the parts of the FIGURE 12 mechanism are believed to be obvious from the foregoing disclosure of their counterparts at the other side of the conveyor 20. Accordingly, the same reference numbers with the suffix "A," but without a detailed description, is believed sufficient to disclose most of the FIGURE 12 structure. Because the transfer arm assemblies of the left side apparatus move in a different direction as above mentioned, their drive train connections are dissimilar from those previously described. The arm 182A is positioned so that it is 180 degrees displaced on its shaft 184A from the position of the arm 182 on its shaft 184 in FIGURE 7. Thus, the gear 202A (FIG. 12) rotates in a direction causing the bracket 206A to swing downstream, and the pear grippers 174A move the gripped pear P along a path 230A and deposit the pear stem end down in a feed cup assembly 25 at the feed station X.

In each case, a pear transferred into one of the processing machines 18 (FIG. 7) at its feed station X is subsequently moved 120 degrees upward to a stemming station Y where the stem end of the pear is trimmed off by the bobbing knife 175, and thence 120 degrees to a transfer station Z where a pusher 266 (FIG. 6) pushes the pear onto a stemming tube 134. The pear thus transferred onto the stemming tube turret 133 progresses through various other stations of the turret and is peeled, cored, halved and discharged.

Driving power for the fruit processing battery 10 is provided by a motor M (FIG. 11) having a variable-pitch sheave 270 and a drive belt 272 trained around sheave 270 and around a pulley 274. The pulley 274 is mounted on the input shaft 276 of a gear box 278, and the sheave 270 provides that the speed of the input shaft can be preselected. One end of an output shaft 280 of the gear box 278 is coupled to the jackshaft 130 which extends along the left side of the conveyor 20.

Figure 11:
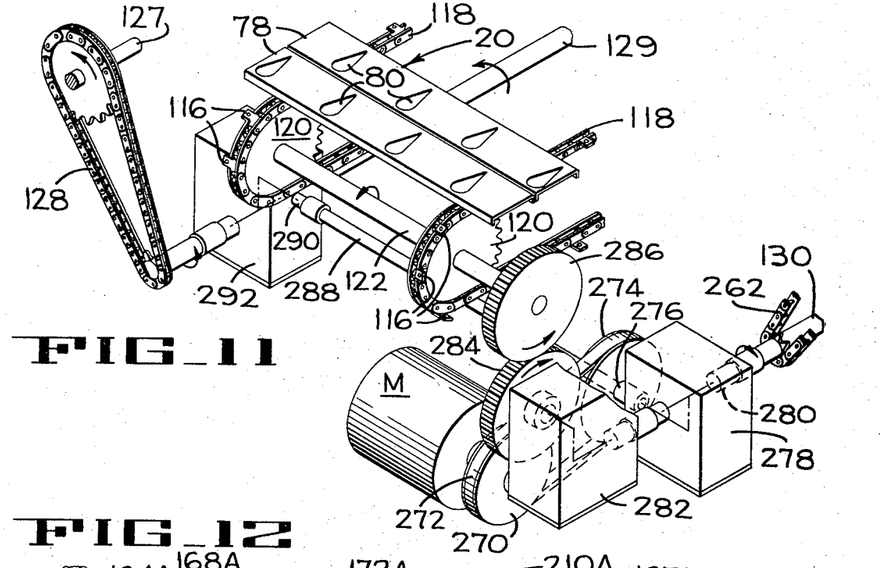
FIGURE 11 is a fragmentary, schematic perspective of part of the drive train for the overall fruit processing battery.

The other end of the output shaft 280 is coupled to the input shaft of a gear box 282. Mounted on the output shaft of the gear box 282 is a gear 284 that is meshed with a gear 286, the latter gear being secured to the conveyor driveshaft 122. An extension shaft 288 of the shaft 276 is connected to the input shaft 290 of a gear box 292 at the other side of the conveyor 20. One output shaft of the gear box 292 powers the chain and sprocket drive train 128 for the pear processing machine at 18d (FIG. 1). The gear box 292 also drives the jackshaft 129 which extends along the right side of the conveyor 20. Thus, the conveyor 20 and the eight pear processing machines 18 are driven in timed relation, and the idle shaft 66 (FIG. 3) of the conveyor 20 drives the pear orienting mechanism 16 and the shuffle feeder 14 in timed relation with the processing machines and the conveyor.

*Operation*

When the fruit processing battery B is installed and placed in operation, the motor 38 (FIG. 3) is energized to power the bulk feeder 13, and the motor M (FIG. 11) is energized to power all of the other components of the fruit processing battery B. The reciprocating grating 32 (FIG. 3) moves up and down, and as the pears P float into the flume discharge neck 30, they are lifted by the grating and deposited on the inlet chute 36 of the shuffle feeder 14. Up and down movement of the slide frame 58 causes the pears to advance stepwise toward the pear orienting mechanism 16 in eight longitudinal lanes L1–L8 (FIG. 1).

As the pears in the conveying lanes arrive at their discharge points adjacent the declining wall 72 (FIG. 3), the pears in the lanes L1, L3, L5 and L7 are discharged when the slide frame 58 rises, but the pears in the lanes L2, L4, L6 and L8 are temporarily blocked because the gates 69 for these lanes rise with the slide frame 58. Then, when the slide frame next lowers, the pears in the last mentioned lanes are discharged.

The pears in each of the lanes L1–L8 gravitate into a chute 74 (FIGS. 3 and 5) ahead of one of the pushers 76 which is descending toward the pear from the upper flight of the pushers. Chute 74 initially suspends the pear by its butt end so that it hangs stem end down. As the pusher moves the pear toward the fruit supply conveyor 20, the stem end of the pear contacts and is retarded by the wall 110 so that the pear is now advancing butt end first.

At the time the pear in any one of the chutes approaches the downstream end of the plate 110, the designated feed pocket 80 for the pear is traveling upward under the plate 110 in timed relation with the pear, and as the pear is swept to an unsupported position beyond the end of the plate 110, its feed pocket 80 is in alignment with the pear, and the pear is dropped into the moving feed pocket.

The feed pockets 80 in alternate flights 78 of the supply conveyor 20 supply pears to the row of processing machines 18 at one side of the conveyors, and the feed cups in the other flights supply pears to the row of processing machines at the other side of the conveyor. As the pears are conveyed past the operator's stations 22 (FIG. 1), the pears can be visually inspected for their alignment in the cups and for visible imperfections which may necessitate their removal before they are further processed.

Figure 7:
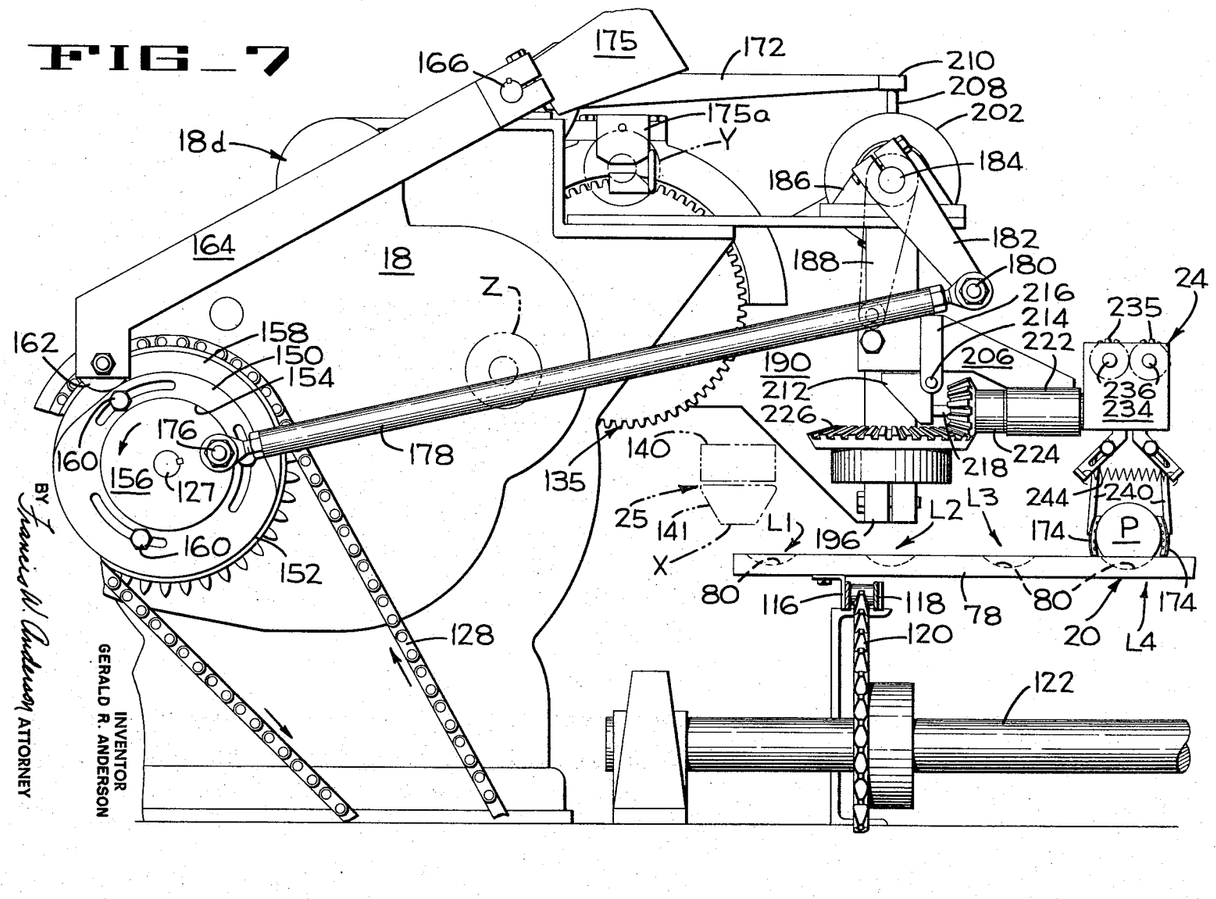
FIGURE 7 is a fragmentary transverse section taken along lines 7—7 on FIGURE 1.

Each of the processing machines 18 is fed from an individual one of the lanes L1–L8, in order to clear the conveyor of all fruit which might otherwise obstruct movement of the transfer arm assemblies 24 since they operate close to the conveying surface. Thus, as shown in FIGURE 7, the successive processing machines in a downstream direction are fed from the outermost conveying lane which has not been emptied by an upstream processing machine. An advantage of this arrangement is that all of the transfer arm assemblies 24 have the same stroke since each processing machine is spaced from its fruit supply lane and the same distance, and the timing requisites for the processing machines do not vary from machine to machine.

Figure 9:
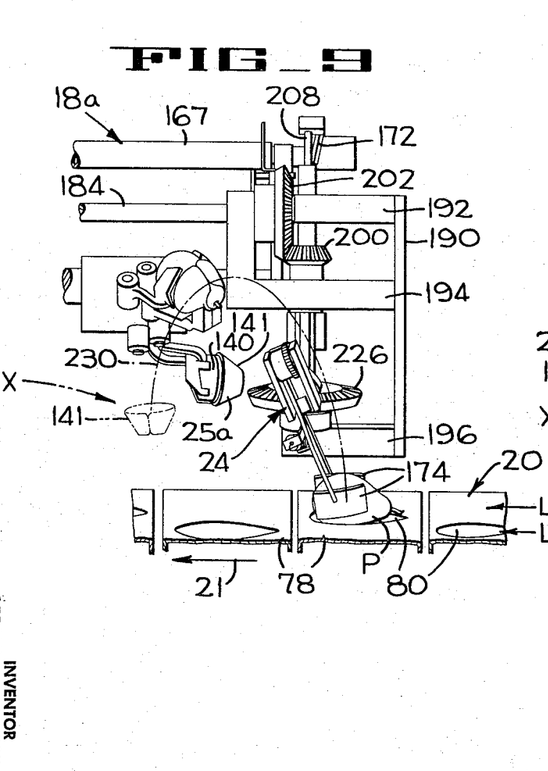
FIGURES 9 and 10 are fragmentary perspectives of part of the apparatus shown in FIGURE 2, and illustrate successive operational positions of a transfer mechanism for feeding pears from a conveyor lane to a pear processing machine.

As a pear P (FIGS. 9 and 10) approaches the first upstream processing machine at 18a at the right side of the conveyor 20, the pear grippers 174 are approaching their pickup position back along the path 230 from a previous feeding and transferring operation such that when the pear is in the position illustrated in FIGURE 9, the grippers 174 are straddling the butt end of the pear. At the same time, the feed cup assembly at 25a (also shown in FIGURE 2) is traveling downward toward the feed station X.

Figure 10:
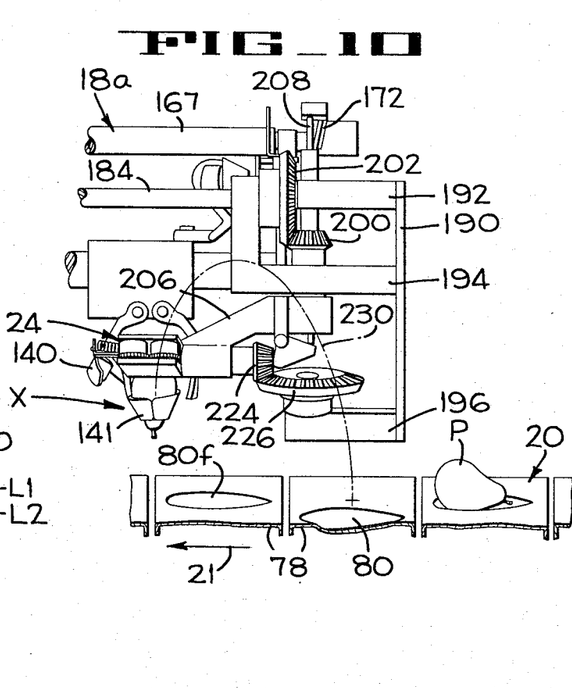

Before the relative positions of the pear P and the grippers 174 can change from their FIGURE 9 positions, the cam follower roller 162 (FIG. 7) attains a position relative to the cam plate 150 substantially as shown, whereby the lever 164 indirectly releases downward pressure on the push rod 208, and the spring 244 (FIG. 8) thus closes the grippers upon the pear. Immediately following this action, the eccentric drive connection at 176 (FIG. 7) causes the shaft 178 to move away from the conveyor 20, whereby the lever 182 moves to its illustrated phantom line position, and in so doing, rotates the shaft 184. Referring to FIGURE 6, this described rotation causes the bracket 206 to swing toward its associated feed cup assembly 25. As illustrated in FIGURES 9 and 10, the pinion gear 224 rolls around the fixed bevel gear 226 during the last-described motion, and the grippers 174 follow the dotted line path 230 to move the pear downstream from its former horizontal position on conveyor 20, to an upright position (stem end down) over the feed cup assembly 25 at feed station X. The upper jaws 140 of the cup assembly are in open condition.

With the grippers 174 positioned over the feed cup assembled, push rod 208 is again moved down, in a manner similar to that which was previously described, and the pear is released by the grippers 174 and drops by gravity into the cup. At this time the feed pocket 80 which carries the pear shown on the conveyor 20 in FIGURE 9 has attained the position of the pocket at 80f in FIGURE 10, and the next pear to be fed is moving toward a pickup position. While the described pear transfer was being effected, each of the other seven pear processing machines 18 were fed in a similar manner from their respective supply lanes L2–L8. Accordingly, the total output of peeled, trimmed, cored and halved pears from the pear processing machines of the overall fruit processing battery B is a multiple of their individual output, and in the present case can be as high as approximately 400 whole pears per minute, although this output can be reduced, if necessary, by appropriate adjustment of the variable-ratio sheave 270 (FIG. 11) and the variable speed motor 38 (FIG. 3), or by using any desired number of processing machines 18 in a smaller processing battery. It will be apparent that a battery can consist of processing machines only at one side of a supply conveyor.

While a particular embodiment of the fruit processing battery of the present invention has been herein shown and described, it will be apparent that certain modifications and variations may be made without departing from the spirit of the invention, and that the scope of the invention should be limited only by proper interpretation of the claims appended hereto.

Having thus described the invention, that which is believed to be new, and for which protection by Letters Patent is desired is:

1. A fruit processing battery comprising a row of spaced-apart fruit processing machines, a continuously driven multiple lane fruit supply conveyor mounted alongside said processing machines, said conveyor being provided with a separate fruit supply lane of fruit supporting pockets for each of said processing machines, each of said machines having a feed cup intermittently positioned at a feed station adjacent said conveyor, fruit transfer means connected to each of said processing machines for gripping, conveying and reorienting fruit from successive moving fruit pockets in said lane between a pickup position in which a fruit pocket lies upstream of said feed cup to a fruit discharge position in which the fruit lies above said feed cup, and means for continuously driving said conveyor, said transfer means and said processing machines in timed relation.

2. Apparatus according to claim 1 wherein all of said transfer means have the same length of fruit conveying movement so that said processing machines are equidistant from their associated fruit supply lanes on said conveyor and thus each have the same timing relation with their associated transfer means and with said conveyor.

3. Apparatus according to claim 1 wherein the upstream processing machine and its associated fruit transfer means is fed from the nearest one of said fruit supply lanes, and wherein successive processing machines along the row are fed from successively more remote fruit supply lanes, all of the fruit in the supply lanes intermediate any one of the downstream processing machines and its associated fruit supply lane thus being removed by the upstream fruit transfer means so that all of said transfer means can operate close to the upper surface of said fruit supply conveyor.

4. Apparatus according to claim 1 and further including means for aligning and feeding fruit into said fruit supporting pockets in each of said supply lanes upstream of said processing machines, and wherein said fruit supply conveyor includes a plurality of transverse conveying flights carrying said fruit supporting pockets, the pockets for adjacent processing machines being in alternate conveying flights, said aligning and feeding means having a fruit orienting chute in alignment with each of said fruit supply lanes and including a flight of pusher elements movable through said chute for propelling fruit into said pockets, said pusher elements being alternately aligned across said aligning and feeding means so that alternate pusher elements propel fruit into alternate conveying flights, and means for driving said aligning and feeding means in timed relation with said conveyor.

5. Apparatus according to claim 1 wherein the stem-blossom axis of the fruit is aligned with the direction of conveying movement, and wherein each of said fruit transfer means includes a bracket pivotable about a vertical axis in a horizontal plane over said fruit supply conveyor from a fruit gripping position in which the bracket is substantially normal to its associated fruit conveying lane to a downstream fruit discharge position in which the bracket is substantially parallel to said conveying lane, means defining a substantially horizontal pivot axis in said bracket, a pair of fruit gripper arms pivotally mounted on the free end portion of said bracket for conjoint pivotal movement about said axes, a fruit gripper mounted on each arm, means for swinging said bracket from said fruit gripping position to said fruit discharge position, and means sequentially operable beginning with said bracket in said first gripping position to close said grippers upon a moving fruit in one of said pockets, to swing said bracket downstream toward said fruit discharge position about said vertical axis and simultaneously pivot said fruit gripper arms rearward and upward over said bracket about said horizontal axis whereby the fruit is positioned above said feed pocket with its stem-blossom axis substantially vertical.

6. A fruit processing battery comprising an elongate multiple lane fruit distribution conveyor, a row of spaced-apart fruit processing machines positioned at individual lateral distances from said conveyor, each of said machines having a feed cup intermittently positioned adjacent said conveyor, said conveyor being provided with a separate lane of fruit conveying pockets for each of said processing machines, a fruit transfer assembly having an arm connected to each of said processing machines and having a fruit gripping, conveying and reorienting means movable between a fruit pickup position overlying said conveyor upstream of said feed cup, to a fruit discharge position in which the fruit overlies said feed cup, all of said transfer assembly arms being of the same length so that said processing machines are equidistant from their associated lanes of fruit conveying pockets on said distribution conveyor, and means for synchronously and continuously driving said distribution conveyor, said transfer assemblies and said processing machines so that the fruit is gripped while in motion for reorientation and transfer into said feed cups.

7. A pear processing battery comprising a shuffle feeder arranged to receive a bulk supply of pears and transfer the fruit in single file lanes to a discharge zone, orienting means adjacent said discharge zone for receiving the pears discharged from each lane of said shuffle feeder and arranged to orient the pears stem end trailing while moving the lanes of fruit toward a second discharge zone, a distribution conveyor having an inlet end underlying said second discharge zone, said conveyor having lanes of conveying pockets in alignment with the lanes of said orienting means and arranged to receive the pears discharged therefrom while preserving said orientation, the pears in the lanes of said distribution conveyor being spaced apart longitudinally of said conveyor and conveyed past respective transfer zones spaced along said conveyor, a pear transfer arm assembly mounted adjacent each transfer zone, a pear processing machine operatively connected to each of said pear transfer arm assemblies, each of said processing machines having a feed cup intermittently adjacent said distribution conveyor and its associated conveying lane in a pear receiving position, said transfer assemblies each comprising means for gripping a pear upstream of said feed cup in said predetermined orientation and for simultaneously conveying and reorienting the pear such that the pear is moved between its stem end trailing position on said conveyor to a position stem end down within said feed cup, and means for synchronously driving said distribution conveyor, said transfer assemblies and said processing machines.

8. Apparatus according to claim 7 in which each of said transfer arm assemblies comprises a fixed frame, a substantially horizontal bracket pivotable in said frame about a vertical axis over said fruit supply conveyor, a horizontally disposed rotatable tubular shaft carried by said bracket, fruit gripping means depending from said shaft for pivotable movement therewith about said vertical axis, a pinion gear secured to said shaft, a fixed shaft mounted in said frame in coincidence with said vertical axis, a non-rotatable bevel gear secured to said shaft in meshing engagement with said pinion gear, and means for pivoting said bracket about said vertical axis whereby said fruit gripping means has a compound motion intermediate a conveying pocket and a feed pocket.

9. Apparatus according to claim 8 wherein the ratio of said gears is so selected that the compound movement of said fruit gripping means reorients and transfers a pear carried thereby substantially 270 degrees from its initial position on said conveyor to a stem end down position superposed above said feed pocket.

10. Apparatus according to claim 8 and a first push rod slidably disposed in said tubular shaft, a relay block pivoted to said bracket and having one face engaged with one end of said push rod, a sceond rotatable tubular shaft coincident with said vertical axis and secured to one end of said bracket, a second push rod slidable within said second shaft and having a lower end engaged with another face of said relay block perpendicular to said first face, first means for oscillating said second shaft to swing said bracket, second means for depressing said second push rod independent of said first means, and means interengaged with said fruit gripping means and the other end of said first push rod for actuating said gripping means independently of swinging movement of said bracket.

11. A fruit transfer arm for conveying and reorienting fruit from a supply conveyor to a feed pocket in a fruit processing machine comprising a fixed frame, a substantially horizontal bracket pivotable in said frame about a vertical axis over a fruit supply conveyor, a horizontally disposed rotatable shaft carried by said bracket, fruit gripping means depending from said shaft for pivotable movement therewith about said vertical axis, a pinion gear secured to said shaft, a fixed shaft mounted in said frame in coincidence with said vertical axis, a non-rotatable bevel gear secured to said shaft in meshing engagement with said pinion gear, and means for pivoting said bracket about sadi vertical axis whereby said fruit gripipng means has a compound motion intermediate said fruit supply conveyor and the feed pocket in a fruit processing machine.

12. Apparatus according to claim 11 wherein the ratio of said gears is so selected that the compound movement of said fruit gripping means reorients and transfers a fruit carried thereby substantially 270 degrees from its initial position on said supply conveyor to a position superposed above said feed pocket.

13. Apparatus according to claim 11 and a first push rod slidably disposed in said tubular shaft, a relay block pivoted to said bracket and having one face engaged with one end of said push rod, a second rotatable tubular shaft coincident with said vertical axis and secured to one end of said bracket, a second push rod slidable within said second shaft and having a lower end engaged with another face of said relay block perpendicular to said first face, first means for oscillating said second shaft to swing said bracket, second means for depressing said second push rod independent of said first means, and means interengaged with said fruit gripping means and the other end of said first push rod for actuating said gripping means independently of swinging movement of said bracket.

14. A fruit processing battery comprising a row of spaced fruit processing machines, a fruit supply conveyor mounted alongside said processing machines, said conveyor being provided with fruit supporting pockets for each of said processing machines, each of said machines having a feed cup intermittently positioned at a feeding station adjacent said conveyor, fruit transfer means individual to each of said processing machines for gripping and conveying fruit from selected fruit pockets between a pickup position in which a fruit pocket lies upstream of said feed cup to a fruit discharge position in which the fruit lies above said feed cup, and means for continuously driving said conveyor, said transfer means and said processing machines in synchronism.

15. A fruit processing battery comprising feed means arranged to receive a bulk supply of fruit and transfer the fruit in single file lanes to a discharge zone, orienting means adjacent said discharge zone for receiving the fruit discharged from each lane of said feed means and operable to orient the fruit while moving the lanes of fruit toward a second discharge zone, conveying means having an inlet end adjacent said second discharge zone, said conveying means having lanes of fruit support means in alignment with the lanes of said orienting means and arranged to move past individual fruit transfer zones spaced along said conveyor, fruit transfer means mounted adjacent each transfer zone, a fruit processing machine operatively associated with each of said fruit transfer means, each of said processing machines having a feed cup intermittently in a fruit receiving position adjacent said conveying means and one of said conveying lanes, said fruit transfer means each being operable to grip a fruit adjacent said feed cup and to simultaneously convey and reposition the fruit from said support means into said feed cup, and means for synchronously driving said conveying means, said fruit transfer means and said processing machines.

References Cited

UNITED STATES PATENTS

| | | | |
|---|---|---|---|
| 2,738,819 | 3/1956 | De Back et al. | 146—51 X |
| 2,979,093 | 4/1961 | Creed et al. | 146—43 |
| 3,096,870 | 7/1963 | Miller | 198—33 |
| 3,144,121 | 8/1964 | Smith | 198—33 |
| 3,246,677 | 4/1966 | Hickey et al. | 146—52 X |
| 3,305,066 | 2/1967 | Elford et al. | 146—51 X |
| 3,324,986 | 6/1967 | Dierksheide et al. | 198—20 |

W. GRAYDON ABERCROMBIE, *Primary Examiner.*